United States Patent [19]

Shibuya et al.

[11] Patent Number: 4,952,365
[45] Date of Patent: Aug. 28, 1990

[54] PROCESS FOR MOLDING OF A FOAMED ARTICLE

[75] Inventors: Takehiro Shibuya; Takashi Nagahara, both of Yokohama; Susumu Imai, Zama, all of Japan

[73] Assignee: Asahi Kasei Kogyo Kabushiki Kaisha, Osaka, Japan

[21] Appl. No.: 27,487

[22] Filed: Mar. 18, 1987

Related U.S. Application Data

[63] Continuation-in-part of Ser. No. 776,139, Sep. 13, 1985, abandoned.

[30] Foreign Application Priority Data

Sep. 14, 1984 [JP] Japan ................................ 59-191499

[51] Int. Cl.$^5$ ............................................. B29C 67/22
[52] U.S. Cl. .................................. 264/45.5; 264/40.3; 264/54; 264/DIG. 83
[58] Field of Search ............. 264/51, 53, 54, DIG. 83, 264/45.5, 40.3

[56] References Cited

U.S. PATENT DOCUMENTS 2,829,117   7/1953  Lindemann .
3,268,635   8/1966  Kraus et al. .
3,694,529   9/1972  Josephsen et al. .
3,960,996   6/1976  Balevski et al. .
3,988,403  10/1976  Angell, Jr. et al. ................ 264/45.5
4,092,385   5/1978  Balevski et al. .
4,096,218   6/1978  Yasuike et al. .
4,129,635  12/1978  Yasuike et al. .
4,208,368   6/1980  Egli ..................................... 264/45.5
4,229,395  10/1980  Nagumo et al. .
4,255,368   3/1981  Olabisi .

FOREIGN PATENT DOCUMENTS 1226135  8/1967  United Kingdom .

Primary Examiner—Jan H. Silbaugh
Assistant Examiner—Allan R. Kuhns
Attorney, Agent, or Firm—Birch, Stewart, Kolasch & Birch

[57] ABSTRACT

A process for producing a foamable thermoplastic resin article having a relatively thin non-foamed outer shell with a smooth surface and a foamed core portion, which has excellent dimensional stability, by pressurizing a mold cavity under a pressure of gas less than the foaming pressure and not less than the surface smoothing pressure of the foamable resin and permitting the pressure of the gas simultaneously with completion of the injection to be communicated to an atmospheric pressure or lower.

6 Claims, 7 Drawing Sheets

PROCESS FOR MOLDING OF A FOAMED ARTICLE

BACKGROUND THE INVENTION

This is a Continuation in Part of Ser. No. 776,139, filed Sept. 13, 1985, now abandoned, which is hereby incorporated by reference.

FIELD OF THE INVENTION

This invention relates to an improved process for producing a foamed thermoplastic resin article and more particularly to an improved process for producing a foamed thermoplastic resin article characterized by a foamed core, a non-foamed exterior skin layer having a smooth surface free from both swirl marks and sinkmarks.

Description of the Related Art

One known process for producing a foamed article, is the short-shot process. The process comprises injecting a thermoplastic resin containing a blowing agent in short-shot quantity into a mold cavity under atmospheric pressure, filling the mold cavity with said resin through foaming and expansion of the blowing agent, and solidifying said resin by cooling within said mold cavity.

The foamed article thus obtained has swirl marks on a surface of the article which has an exterior skin layer substantially non-foamed and a foamed core. The foamed article thus prepared has the following characteristics:

(1) higher rigidity per weight;
(2) smaller warpage due to relaxation of molding residual strain by foaming;
(3) no formation of sinkmarks at the thick portion due to foaming; and
(4) capability of molding at a relatively lower injection pressure and mold clamping pressure, which enables molding of a large scale article by means of an inexpensive machine.

On account of the above characteristics, the conventional foamed articles have been used as substitutes for large scale wood materials, but are at a disadvantage for structural parts for outer decorative purposes because of the drawback of swirl marks on the surface.

Attempts have been made to overcome the drawback of swirl marks on the surface, while retaining the characteristics of the foamed article as described above. For example, one method to rid the surface of the foamed article of swirl marks is disclosed in U.S. Pat. No. 3,268,635 and German OLS 1,504,278. This is a process wherein a resin is injected into a mold cavity pressurized with a gas. This is also known as the gas-counter pressure process. Specific processes embodying this method are disclosed in U.S. Pat. Nos. 3,960,996, 4,096,218 and 4,255,368.

U.S. Pat. No. 4,255,368 discloses a process comprising the steps of: plastifying, kneading and then metering and accumulating a molten mixture of a thermoplastic polymer and a soluble gas blowing agent at a pressure above the foaming pressure of said mixture, feeding said mixture into a mold cavity maintained at a temperature sufficiently low to cause the outer portion of said mixture to form a self-supporting exterior shell in said mold at a volume sufficient, in the unfoamed state, to substantially fill said mold cavity; allowing the outer portion of the charge to cool in said cavity to form a self-supporting exterior shell while maintaining the mold cavity at a pressure above the foaming pressure of said mixture; thereafter releasing the pressure within the mold cavity to provide a temperature and pressure gradient to cause (i) the thermoplastic material therein to contract and (ii) gas desolubilization and expansion so as to balance the volume contraction of said charge which would otherwise have resulted from said gradients, to produce a foamed core and exterior solid shell; and removing the resultant article from said mold cavity.

However, this process suppresses foaming of the resin mixture, which produces a foamed article which has a little foamed core portion and an excessively thick exterior non-foamed solid shell. The resultant foamed article may be apt to have sinkmarks on the surface in which the thickness is relatively thin and warpage due to lack of relaxation of residual strain by poor foaming.

SUMMARY OF THE INVENTION

It is an object of the present invention to provide an improved process for preparing a foamed thermoplastic resin article which has a non-foamed outer shell having a smooth surface free from both swirl marks and sinkmarks and a foamed core portion by pressurizing a mold cavity at a gas pressure not higher than the foaming pressure of the foamable resin and permitting the gas pressure simultaneously when the mold cavity is filled with the resin to be communicated to an atmospheric pressure or lower. More specifically, the process according to the present invention is an improved process for the molding of a foamed thermoplastic resin article comprising a non-foamed outer shell having a smooth surface and a sufficiently foamed core portion, which comprises the steps of:

(1) plastifying, kneading, metering and accumulating a foamable resin at a pressure which is higher than its foaming pressure and sufficiently suppressing said foamable resin in an unfoamed state, (2) injecting the foamable resin into a mold cavity set at a pressure which is not higher than the foaming pressure and not lower than the surface smoothing pressure which is sufficient to form a smooth, swirl-mark free and sink-mark free surface on the non-foamed outer shell, the shell being successively formed at the surface where the resin contacts with the mold cavity, (3) lowering the pressure within the mold cavity (a) by discontinuing injection of the resin simultaneously when the mold cavity is filled with the resin, (b) discontinuing feeding of the pressurized gas into the mold cavity and (c) making the mold cavity release at an atmospheric pressure or lower, (4) thus subsequently making the resin foamable at the core portion enclosed within the said non-foamed outer shell in the pressure-lowering step, and (5) solidifying the foamed article by cooling and removing the foaming article after solidification.

A particular preferred process is wherein the lowering of the pressure within the mold cavity is carried out (1) by making the plural gaps release at an atmospheric pressure or lower, in order that the injected resin contacting with the plural gaps penetrates the mold cavity, (2) discontinuing injection of the resin simultaneously when the mold cavity is filled with the resin, (3) discontinue charging of the pressurized gas into the mold cavity and (4) making the mold cavity release at or below atmospheric pressure.

It is another object of the present invention to provide an improved process for molding a foamed thermoplastic resin article which has a relatively thin non-foamed outer shell having a smooth, swirl-free and sink-free surface and a sufficiently foamed core portion which is free from warpage.

BRIEF DESCRIPTION OF THE DRAWINGS

In the drawings:

In FIG. 8, 13 shows a mold cavity consisting of an upper mold 11 and a lower mold 12 having a gas ditch 16 around the cavity and plural gaps 17,18,19 and 20 provided penetrating in the mold wall.

Figure 1:
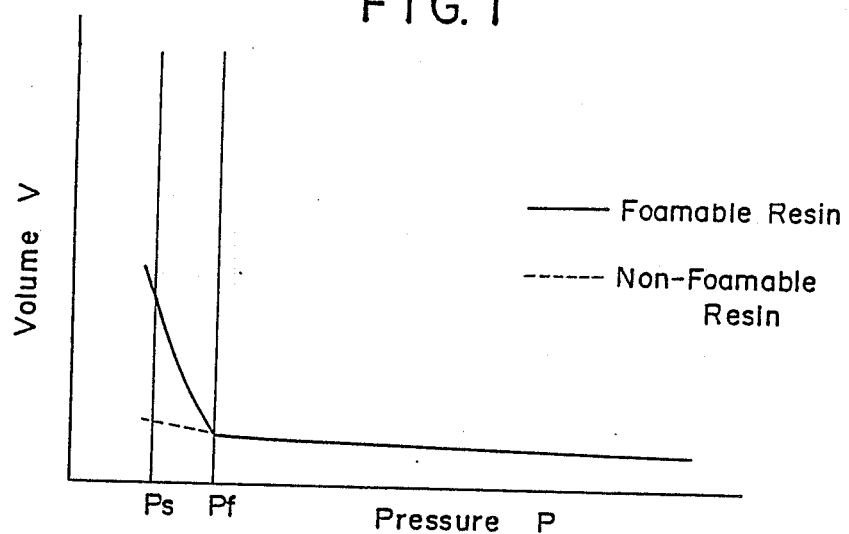
FIG. 1 is a graph showing the relationship between a pressure and a volume of a foamable resin and a non-foamable resin.

The gas ditch around the cavity 16 and that plural gaps 17,18,19 and 20 are connected to the corresponding three way directional valves which connect to an atmosphere pressurized N$_2$ gas source 26 and a pressure reduction source 27.

Further, 14 shows a sprue (an inlet for the resin); 15 O-ring; 21 through 25 and 31 through 35 a three-way directional valve; 28 a gas vent between a mold cavity 13 and a gas ditch 16; 30 an end portion of a mold cavity 13.

DESCRIPTION OF THE PREFERRED EMBODIMENTS

The definition and the measurement of the foaming pressure of the present invention are as follows.

A foaming pressure of the resin is explained as follows.

Figure 3:
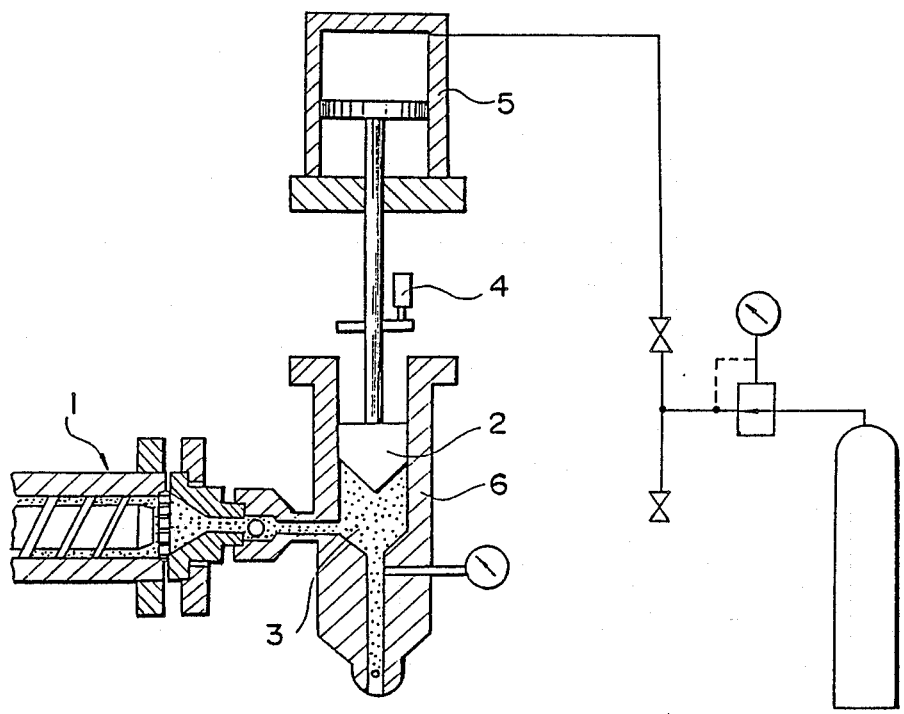
FIG. 3 is a schematic sectional illustration of an injection molding machine modified for measuring the pressure-volume behaviors and foaming pressure of a foamable resin.

When the pressure in the accumulator (3) in FIG. 3, is lowered in a high pressure region, a volume of a foamable resin, similar to a non-foamable resin, is slightly increased due to slight compressibility of the molten resin with an increase of pressure.

Figure 4:
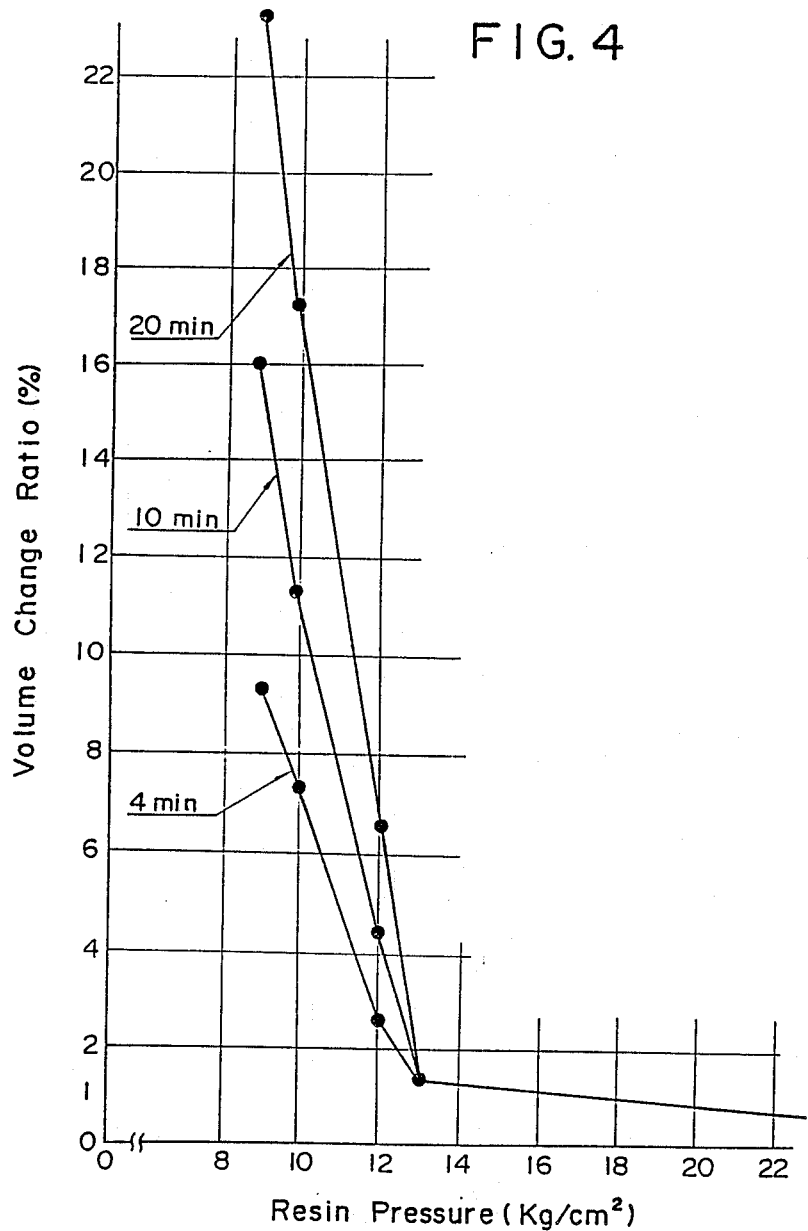
FIG. 4 is a graph showing the relationship between a pressure and a volume change ratio of a foamable resin with the lapse of time.

However, in a lower pressure region than a certain pressure, a volume of the foamable molten resin is abruptly decreased with an increase in pressure and still more abruptly decreased with a lapse of time as shown in FIG. 4 at the same pressure.

The behavior of the abrupt volume change is caused by the foaming and expansion of the foamable molten resin.

The critical pressure, which abruptly changes the volume-pressure behavior of the foamable resin, is defined as the foaming pressure (Pf) in the present invention.

The foaming pressure (Pf) has been determined quantitatively by measuring the pressure—volume behavior of the foamable resin directly, and it has been found that the foaming pressure (Pf) varies depending on the blowing agent employed and its amount in the formulation, and the (Pf) is changed slightly higher as the temperature of the resin is elevated.

The foamable resin is maintained in an unfoamed state at the pressure not lower than the foaming pressure (Pf).

The pressure of not lower than the foaming pressure (Pf) has the same meaning as the expression of "pressure high enough to suppress foaming" in the prior art.

The definition and the measurement of the surface smoothing pressure of the present invention are as follows.

According to the prior art, for obtaining a foamed article with a smooth surface free from swirlmarks, it has been considered necessary to pressurize a mold cavity at a pressure sufficient to suppress foaming of a foamable resin (that is, a pressure higher than the foaming pressure). But, when a mold cavity is pressurized at a pressure greater than the foaming pressure, while a foamed article having a smooth surface can be obtained, a thick layer of non-foamed outer shell is formed on the foamed article, whereby the foaming ratio of the foamed article is lowered. Therefore, especially when the process wherein a mold cavity is pressurized to a point greater than the foaming pressure, and is applied to a molding which is relatively thin and has a complicated shape having lattice portions and hole portions, sinkmarks will be formed on the surface as well as warpage which results in loss of the characteristics of a foamed article. On the contrary, a foamed article produced by the process of the present invention has an outer shell of a relatively thin layer with a smooth surface and a foamed core portion of a thick layer which overcomes the problems in the prior art.

The pressure of the gas in the mold cavity necessary for obtaining a foamed article with smooth surfaces free from both swirl marks and sinkmarks according to the process of the present invention has been measured as described in Reference Example 1 below. The lowest pressure at which the swirlmarks disappear from the surface of the article is defined as the surface smoothing pressure. As a result, the surface smoothing pressure is found to be 50 to 70% of the foaming pressure of the foamable resin.

FIG. 1 shows the P-V behaviors of a formable resin, exhibiting the relationship between the above-mentioned foaming pressure and the smoothing pressure at a certain temperature set for the foamable resin. P is the pressure applied on the resin, V is the volume of the resin, the solid line exhibiting the P-V locus of a foamable resin and the broken line the P-V locus of a non-foamable resin.

A reference to the locus concerning the pressure in the mold cavity in order to explain the preferable quantity of the resin injected is as follows.

Figure 2:
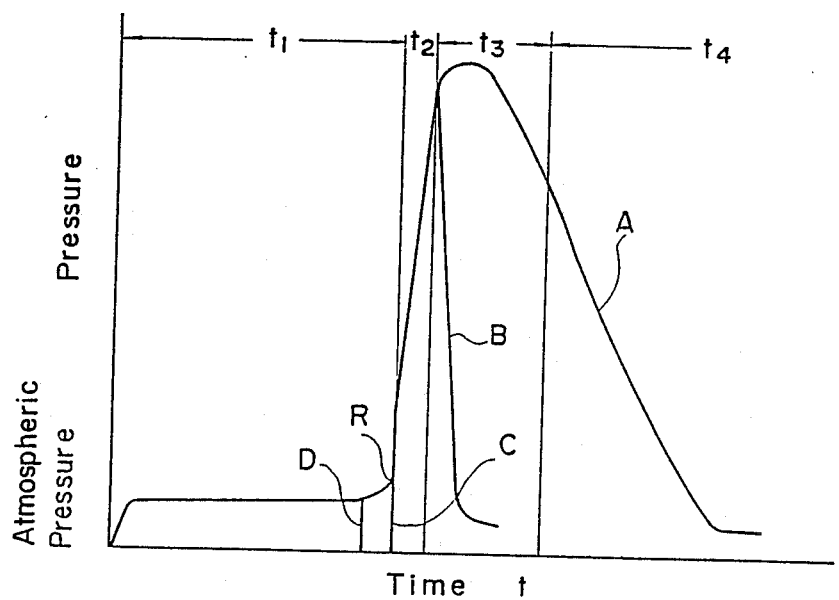
FIG. 2 is a graph showing the loci of a pressure in mold cavity during an injection step of a foamable resin with the lapse of time.

FIG. 2 shows behaviors of the pressure in a mold cavity with the lapse of time during the injection process. The pressure in mold cavity is measured by the method in which a pressure sensor for detection of the pressure in the mold cavity is provided at the mold wall of the mold cavity. The mold cavity is pressurized with a gas by the use of a mold having a structure which can be pressurized with a gas. A foamable resin is injected and feeding of the gas into the mold cavity is discontinued simultaneously when the mold cavity is filled with the resin to release the mold cavity to the atmospheric pressure. The locus A is the locus of pressure in the mold cavity obtained when a foamable resin is forced to be overfilled in the mold cavity. The locus A may be divided according to the lapse of time into $t_1$: inflow, $t_2$: filling, $t_3$: overfilling and $t_4$: cooling. In the region $t_1$, the foamable resin flows into the mold cavity until the mold cavity is completely filled up. In the region $t_2$, the mold cavity is still forced to be filled with the foamable resin, therefore the pressure in the mold cavity is abruptly elevated. Meanwhile, the flex point R in pressure elevation will be generated. In the region $t_3$, the foamable resin is over-filled under a high pressure. A self-maintaining, firm and thick outer shell is formed in regions $t_2$ and $t_3$. In the region $t_4$, the pressure in the mold cavity will be gradually dropped through volume shrinkage by cooling. The boundary between the regions $t_3$ and $t_4$ is determined as the moment when the foamable resin at the sprue of the mold is solidified by cooling and further injection of the foamable resin into, the mold cavity is shut out.

As contrasted to the pressure locus A, the pressure locus B will be obtained when injection of the foamable resin is stopped between $t_2$ and $t_3$, the pressure locus C when injection is stopped between $t_1$ and $t_2$, and the pressure locus D when injection is stopped in the course of $t_1$.

Of the loci A, B, C and D of pressure in the mold cavity shown in FIG. 2, the preferable locus of pressure in the mold cavity in the process of the present invention is at locus C.

The above locus C of the pressure in the mold cavity can be accomplished by carrying out the injection step by injecting a foamable resin into a mold cavity pressurized with a gas and discontinuing injection simultaneously when the mold cavity is filled with the resin. The article obtained by the locus C is a foamed article having a uniformly smooth surface, and a shape which is accurately the same as the shape of the mold cavity.

In contrast, the locus D will form a smooth surface at the vicinity of the flow end of the mold cavity, but a surface with swirl marks will be formed in the interim up to the flow end, forming a linear concavity on the surface at its boundary, to give a product different from that obtained by the process of the invention. At the locus B, the pressure in the mold cavity becomes high, without dropping momentarily after discontinuation of the injection. Thus, it is the unfavorable locus of pressure in the mold cavity. The locus A is inappropriate for the foam molding process.

The embodiment of the present invention can be described as follows.

In the process of the present invention, the foamable resin is subjected to plastifying and kneading and then metering and accumulating at a pressure (back pressure) greater than the foaming pressure. The density of the foamable resin accumulated after metering becomes the density inherent in the resin at the temperature and the pressure set.

The injection step in the process of the present invention consists of the following procedures:

(i) feeding a gas with a low pressure not less than the surface smoothing pressure and less than the foaming pressure of the foamable resin into a mold cavity, (ii) injecting the foamable resin until completion of the filling of the mold cavity and immediately discontinuing the injection, and (iii) discontinuing feeding of the gas into said mold cavity simultaneously with discontinuation of the above mentioned injection, and permitting the mold cavity to be communicated to atmospheric pressure or lower. According to these procedures, foamed article with a non-foamed outer shell and uniform smooth surface and a foamed core portion enclosed within the non-foamed outer shell is formed within the mold cavity. The non-foamed outer shell of uniform smooth surface is formed successively at the portion which the foamable resin contacts with the wall of the mold, and the non-foamed outer shell will be completed simultaneously with completion of the injection.

The foamable resin at the core portion enclosed within the non-foamed outer shell is released of its pressure to a lower pressure less than the foaming pressure, preferably to an atmospheric pressure or lower by dropping of the gas pressure and pressure in mold cavity. The release of the pressure makes the foamable resin at the core portion attain a foamed state.

In the process of the present invention, when the foaming pressure of a foamable resin is sufficiently higher than pressure in mold cavity of the foamable resin on completion of filling up of the mold cavity, it may be considered that the foamable resin flowing into the core portion within the non-foamed outer shell formed in the mold cavity attains a foamed state during inflow.

In the press of the present invention, a quantity of the resin injected is preferably the quantity that will completely fill up the mold cavity. Injection is discontinued simultaneously with completion of the injection, then, plastifying, kneading and then metering and accumulating for the subsequent injection operation is prepared in the extruder and the injection cylinder. The extruder and the injection cylinder or the injection cylinder is maintained at a pressure not lower than the foaming pressure of the foamable resin until next initiation of injection. When the resin injection is completed, the mold clamping force can be lowered. For example, when an acrylonitrile-butadiene-styrene copolymer resin (hereinafter abbreviated as ABS resin) is injected at 240° C. into a 7 cm thickness mold cavity, the pressure in the mold cavity is 20 Kg/cm² at the flex point when the mold cavity is completely filled with the resin, and at the point when the forced filling pressure will exceed 200 Kg/cm². Also, when the injection is discontinued at said flex point, the pressure in the mold cavity is immediately lowered and foaming of the foamable resin is promoted. The resin quantity injected is most preferred to be the quantity at said flex point when the gentle elevating gradient of the pressure in the mold cavity during injection is flexed, but a quantity slightly exceeding the flex point is also allowed.

The gas fed into the mold cavity must be maintained only for a short time until the foamable resin under unfoamed state flows into the mold cavity overcoming the pressure of said gas and contacts with the inner walls of the mold, which then forms a non-foamed outer shell in the vicinity of the inner wall.

The gas is fed into and released from the mold cavity through plural gaps which are provided penetrating the mold wall and which permits passage of the gas but inhibits inflow of the resin. The plural gaps are preferably provided at the portions of the wall in which the shape of the mold cavity is complicated, in which the thickness of the mold cavity is relatively thin, and at the portions which are distant from the injecting nozzle for the resin. Also, early release of the pressure of the gas within the mold cavity immediately after formation of the non-foamed outer shell will afford urging of making for easier accurate transfer of the shape of the mold cavity to the resultant article. Because the gas does not remain between the inner wall of the mold and the non-foamed outer shell formed thereat, the non-foamed outer shell is urged by the foaming pressure of the core portion against the inner wall of the mold cavity.

Also, at the portions with shapes of relatively large area in contact with the mold cavity such as lattice portion, hole portion and end portions of the article, where the resin in the cavity is cooled relatively rapidly, thicker outer shells will be formed quickly to form sinkmarks, and hence it is effective to employ the method in which the pressure of the gas in the mold cavity is released successively corresponding to the inflow of the resin, in order to obtain a foamed article consisting of an outer shell with uniform smooth surface without surface defects due to sinkmarks and a foamed core portion in a complicated shape of article with a relatively thin thickness of 5 to 8 mm having lattice portions and hold portions.

In the molding process wherein the cooling step follows directly after completion of the injection step as in the process of the present invention, it is not required at all to maintain the pressure of the gas within the mold cavity until formation of the self-maintaining, firm and thick outer shell. The reason for this is that the foamable resin in the non-foamed outer shell formed in the mold cavity is not migrated or flown as in the processes disclosed in U.S. Pat. Nos. 3,960,996 and 4,096,218. Continuous maintenance of the feeding of the gas into the mold cavity after discontinuation of injection is not desirable, not only, because the transfer of the shape of the mold cavity is worsened, but also because the cells formed in the core portion will disappear or be reduced to lower the degree of forming of the molding.

The article in the process of the present invention should desirably have a thickness of approximately 5 to 8 mm as the standard thickness of molding suitable for a relatively thin articles. Further, the process of the present invention may also be applicable for a thick article. But, when the standard thickness of the molding is 3 mm, for example, in case of article of ABS resin at 240° C., the pressure in mold cavity will exceed 150 $Kg/cm^2$ during the injection, whereby the clear flex point between the injection inflow and filling will disappear and the foaming degree of the article becomes also very low.

The cooling step in the process of the present invention should preferably be controlled at a cavity temperature which is not lower than the dew point of steam in the air on the mold cavity surface and lower by 10° C. than the heat distortion temperature (JIS K 6871). In the cooling step, the article is taken out after the foamed resin in the mold cavity has been cooled and solidified to a temperature at which it is foamed to the extent to compensate for volume shrinkage and solidified.

The present invention employs thermoplastic resins such as polymers of olefins, styrenic polymers, acrylic polymers, methacrylic polymers, polyphenylene ether and the mixtures of polyphenylene ether and polystyrene, polycarbonate, polyester, polyamide, polyoxymethylene and the copolymers thereof and graft copolymers thereof, blend resins comprising the resins described above and resins mixture additions with the resins described above.

The blowing agents which are employed in the present invention are volatile blowing agents such as nitrogen, carbon dioxide, hydrocarbons, halogenated hydrocarbons, and decomposition type organic or inorganic blowing agents such as sodium dicarbonate, N-nitroso compounds, azo compounds, sulfonyl hydrazides. They can be employed either alone or in admixture thereof. These blowing agents may be either mixed with the foamable resins employed before the mixing process before the injection step, or mixed with the foamable resins employed by injecting with pressure into the extruder used in the mixing process. The foamable resin employed may be prepared by diluting the foamable resin mixed with the above mentioned blowing agents with the unfoamable resins.

The pressurizing gas to be employed in the present invention is a pressurized gas such as nitrogen and air, which is to be controlled at a pressure which is not lower than the surface smoothing pressure and not higher than the foaming pressure of the foamable resin.

REFERENCE EXAMPLE 1

By means of a molding machine having a pre-plasticating structure as shown in FIG. 3, a foamable resin was plastified and kneaded by an extruder (1) (40 mm o) to be metered and accumulated (3) to 830 cc in an injection cylinder (6) under a pressure of 80 $Kg/cm^2$, (back pressure) and the position of the injecting piston (2) was read with the lapse of time by a position detective device (4) to measure the pressure and the volume change ratio of the foamable resin.

First of all, a foamable resin prepared by a dry blend of 100 parts by weight of a styrene-acrylonitrile copolymer resin (hereinafter called a SAN resin; Stylac ® AS 769, produced by Asahi Kasei Kogyo Kabushiki Kaisha), dried at 85° C. for 3 hours, with 0.3 part by weight of azodicarbonamide was plastified and kneaded at 230° C. at a back pressure of 80 $Kg/cm^2$ to be metered and accumulated in the injection cylinder (6) at a pressure of 80 $Kg/cm^2$. At first the volume of the foamable resin in the injection cylinder (6) under the pressure of 80 $Kg/cm^2$ was measured, the pressure in the injection cylinder (6) was gradually lowered by controlling the pressure which is charged with the injecting piston (2) and the amount of volume change while the change of the pressure was measured, and the volume change ratios (%) relative to the respective pressures were calculated to give FIG. 4.

As apparently seen from FIG. 4, the volume of the foamable resin was increased by about 1% by decreasing the pressure to 13 $Kg/cm^2$, but there was no further change in volume with the lapse of time. However, in the pressure region less than 13 Kg/cm$^2$, the volume became abruptly increased with decreasing of the pressure, and the volume further increased with the lapse of time 13 Kg/cm$^2$ was the foaming pressure of this foamable resin at 230° C.

The foaming pressures measured similarly by varying the amount of the blowing agent, temperature and the resin employed are shown in Table 1.

A foamable resin comprising a dry blend of 100 parts by weight of the above dried SAN resin, 0.3 part by weight of water and 0.3 part by weight of azodicarbonamide was subjected to measurement of the foaming pressure at 230° C. As a result, it was found to be 17 Kg/cm$^2$, thus being increased by 4 Kg/cm$^2$ in foaming pressure by addition of 0.3 part by weight of water.

Next, by means of a molding machine in which the injection control system of the injection actuator (5) with a preplasticating structure as shown in FIG. 3 was replaced with the known hydraulic pressure control system, the foamable resin was plastified, kneaded and then metered, and injected into a mold (not shown in FIG. 3) with a mold cavity structure of 300 mm×300 mm×7 mm thickness can be pressurized with a gas, solidified by cooling and the article was then taken out for observation of its surface. The gas pressure in which the swirl marks disappear from the surface of the article (that is defined as the surface smoothing pressure (Ps) in the present invention) was measured. Table 1 also shows the measured values of surface smoothing pressures of foamable resins obtained by blending SAN resin, ABS resin (Stylac® 100, produced by Asahi Kasei Kogyo Kabushiki Kaisha) and a modified polyphenylene ether resin (hereinafter abbreviated as PPE resin, Xyron® F200Z) severally with blowing agents. Surface smoothing pressures were found to be in the pressure regions lower than the foaming pressures, respectively.

REFERENCE EXAMPLE 2

The molding machine employed for molding in Reference Example 1 was mounted with a mold having a mold cavity of 300 mm ×100 mm×7 mm thickness, which could be pressurized with a gas and is provided on the wall surface with a pressure sensor for detection of the resin pressure in the mold cavity. A foamable resin comprising a dry blend of 100 parts by weight of the above ABS resin, dried at 85° C. for 3 hours, with 0.3 part by weight of azodicarbonamide was plastified and kneaded at 240° C. to be metered and accumulated at a pressure of 80 Kg/cm$^2$.

Figure 5:
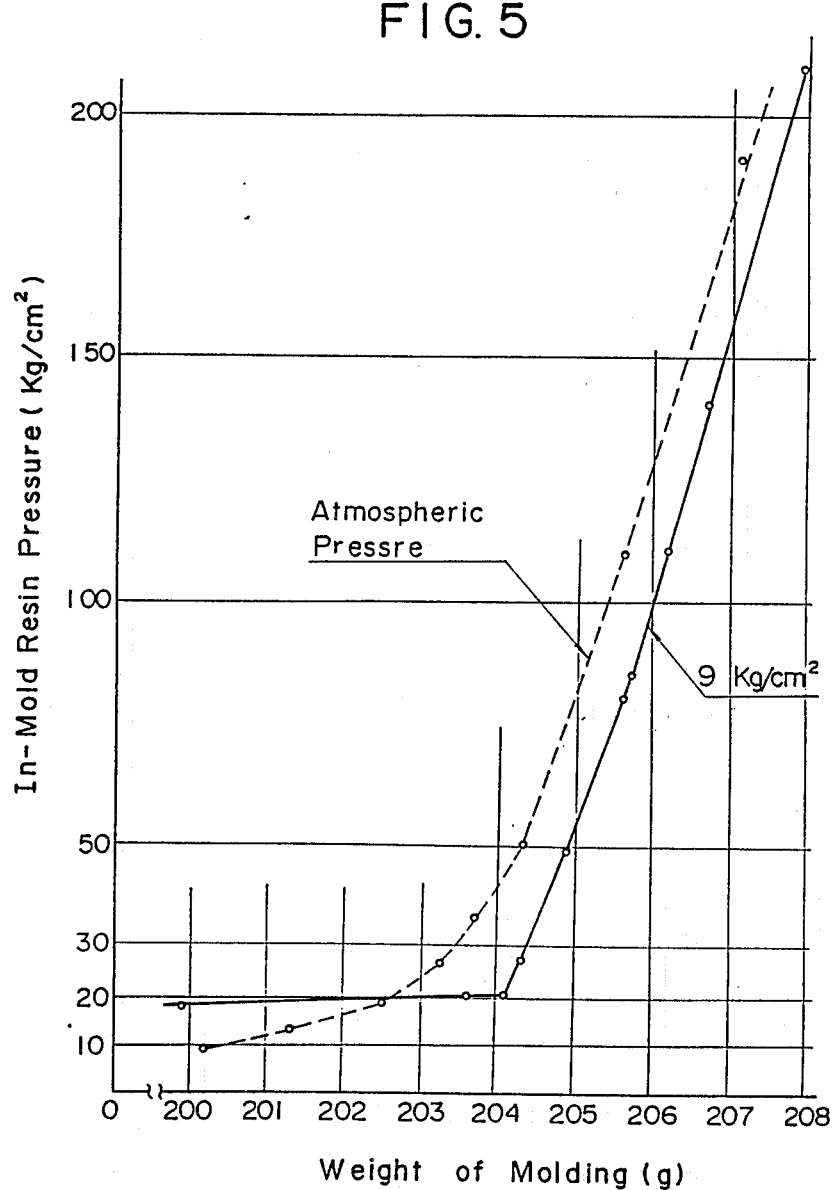
FIG. 5 is a graph showing the relationship between the weight of the article and the pressure in the mold cavity when a foamable resin is injected into a mold cavity at a gas pressure of atmospheric pressure and at a gas pressure of 9 Kg/cm$^2$.

Next, the pressure of the gas was set at 9 Kg/cm$^2$, and injection was performed under an injection pressure of 700 Kg/cm$^2$ by varying the quantity of the resin injected in order. Simultaneously with discontinuation of injection, the pressure of the gas was released to the atmosphere, followed by cooling of the mold cavity to 40° C. for 3 minutes, and then the article was taken out. The same operation was performed except that the pressure of the gas was set at atmospheric pressure from the beginning. Both relationships of the weight of the molding and the maximum values of resin pressures in the cavity in the injection step are shown in FIG. 5.

When the pressure of the gas in the mold cavity was 9 Kg/cm$^2$, the weight of the molding was increased with the increase of the quantity of the resin flowed into the mold cavity by injection and the maximum value of the pressure in mold cavity was also increased, being increased with a gentle gradient in the lower pressure region to reach completion of the injection. When the injected resin quantity was further increased, the pressure in the mold cavity was abruptly elevated to find a flex point. The flex point coincided with the quantity of injected resin when the swirl marks and their borderlines at the flowing ends completely disappeared from the surface of molding to give a molding with a uniform smooth surface. The quantity of injected resin for obtaining a foamed article with uniform smooth surfaces free from both swirl marks and sinkmarks was the quantity which was introduced at the point when the pressure in mold cavity reached the flex point or higher in the elevation gradient of the pressure in mold cavity as shown in FIG. 5. The most preferred injected resin quantity was substantially the quantity at the flex point, namely when the mold cavity is filled with the resin.

In contrast, when the pressure of the gas in the mold cavity was atmospheric, no clear flex point yielded in the elevation gradient of the pressure in mold cavity. On the other hand, an increase in the pressure in the mold cavity during injecting began at a lighter weight of the article than in the case of 9 Kg/cm$^2$ of the pressure of the gas in the mold cavity, thus indicating probably that in the case of the mold cavity being under atmospheric pressure the foamable resin is under a foamed state during injecting.

REFERENCE EXAMPLE 3

Figure 6:
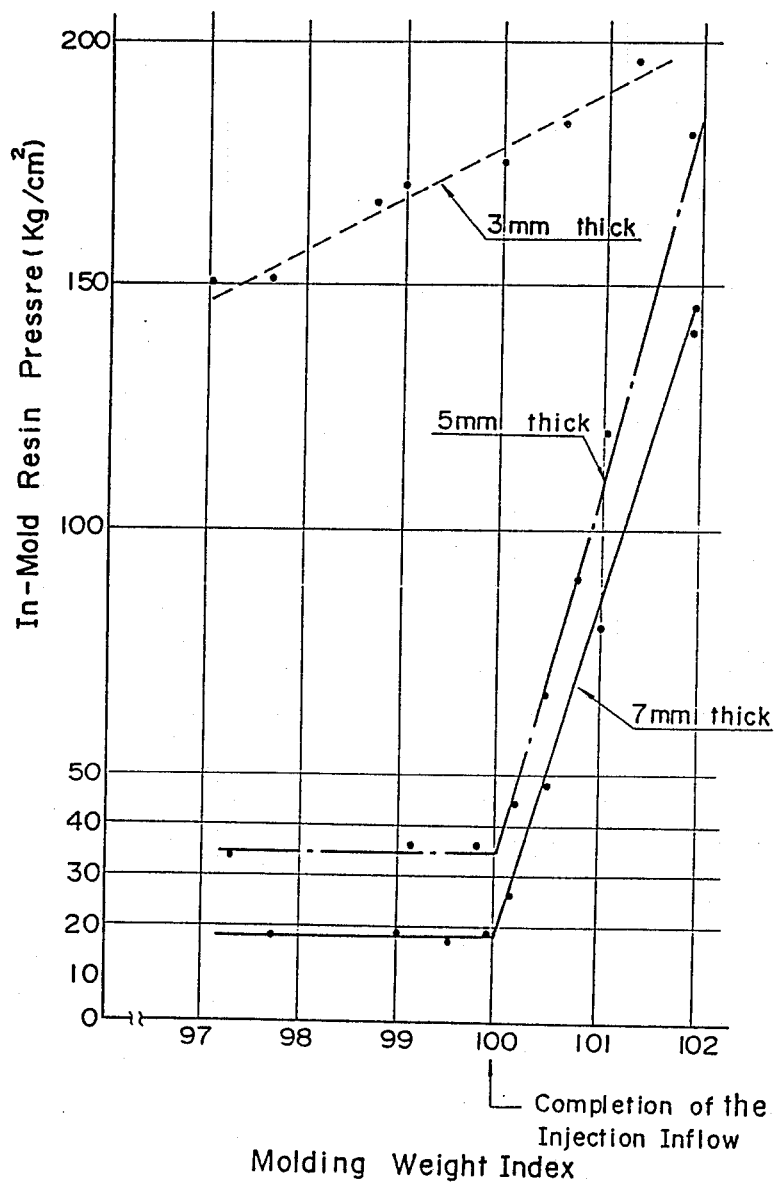
FIG. 6 is a graph showing the relationship between the molding weight index of the article and the pressure in the mold cavity on completion of the injection under a thickness of 3 mm, 5 mm and 7 mm, respectively.

Reference Example 2 was repeated except that the thickness of the mold cavity of 300 mm×100 mm was varied as 3 mm, 5 mm and 7 mm, and the injection speed was retarded to ½, with the pressure of the gas in the mold cavity set at 9 Kg/cm$^2$. The weights of the article obtained were measured against the pressure in the mold cavity, respectively, and the respective weights of the articles were calculated in terms of article weight index on the basis of the article weight at the flex point of the pressure in the mold cavity, namely on completion of the injection, 100, to give the results as shown in FIG. 6.

In the case of the thickness of articles of 5 mm and 7 mm, flex points in elevation gradient of the pressure in the mold cavity on completion of the injection were generated. And the pressure was low and near the foaming pressure of the foamable resin. However, in the case of the article 3 mm thickness, the pressure the in mold cavity increased during injection to a higher pressure to give rise to no flex point in elevation gradient of pressure in mold cavity on completion of the injection.

REFERENCE EXAMPLE 4

The same molding machine as in Reference Example 2 was mounted with a mold having a mold cavity of 300 mm×100 mm×6 mm thickness, which could be pressurized with a gas. A foamable resin was prepared by dry blend of 100 parts by weight of SAN resin, dried at 85° C. for 3 hours, with 0.2 part by weight of azodicarbonamide. The above foamable resin was plastified and kneaded at 230° C. to be metered and accumulated at a resin pressure of 80 Kg/cm$^2$, and the nitrogen gas pressure in the mold cavity was set at (i) 6 Kg/cm$^2$ (not lower than the surface smoothing pressure and less than the foaming pressure), (ii) 20 Kg/cm$^2$ (above the foaming pressure) and (iii) 25 Kg/cm$^2$ (above the foaming pressure). The above mentioned foamable resin was injected into the mold cavity of 40° C. and injection was discontinued on completion of the injection, and the retention time for feeding of the above mentioned nitrogen gas thereafter was varied and the article was taken out after cooling for 3 minutes. The articles were found to be transparent and the state of foamed cells at the core portion could sufficiently be observed with the naked eye.

Figure 7:
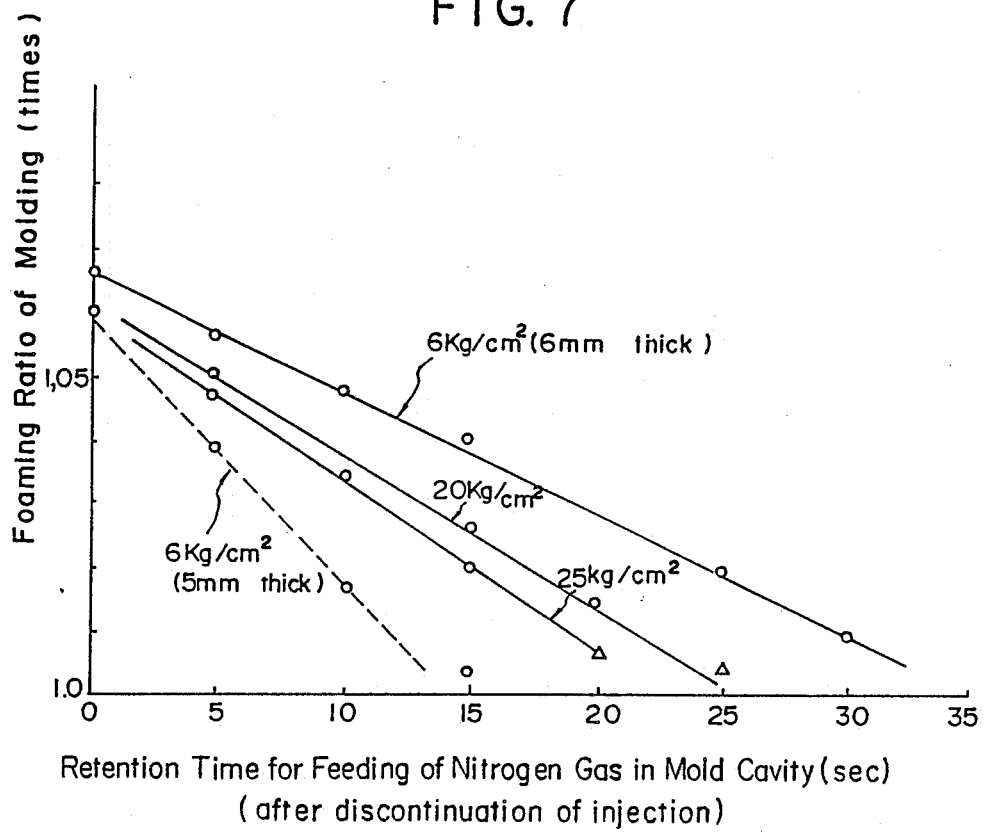
FIG. 7 is a graph showing the relationship between the retention time for feeding of a gas into a mold cavity and a foaming ratio of the foamed article under a thickness of 6 mm and the gas pressure in the mold cavity of 6 Kg/cm$^2$, 20 Kg/cm$^2$ and 25 Kg/cm$^2$, respectively and under a thickness of 5 mm and the gas pressure in the mold cavity of 6 Kg/cm$^2$.

The average density of the foamed article obtained was measured by the replacement-in-water method and the foaming ratio of the foamed article was calculated from the density of 1.07 g/cm² of the unfoamed article to give the results shown in FIG. 7. From FIG. 7, it can clearly be seen that the pressure of the gas in the mold cavity should more preferably be the lower pressure between not lower than surface smoothing pressure and less than the foaming pressure in order to get the article of a higher foaming ratio.

It is also clear that the timing for releasing the pressure of the gas in the mold cavity is most preferably the same time as the discontinuation of injection, that is, the retention time for the feeding of the nitrogen gas in FIG. 7 is zero. As the retention time for the feeding of the gas in the mold cavity is prolonged, the number of the foamed cells at the core portion in the foamed article were clearly confirmed to be reduced and disappears to the naked eye. In FIG 7, the mark indicates the article in which the foamed cells at the core portion in the article can be recognized with naked eyes, and the mark indicates the article in which substantially no foamed cell at the core portion in the article can be recognized with the naked eye. As the foamed cells at the core portion were reduced to the point of disappearance, sinkmarks were formed on the surface, and warpage of the article was found to increase. Also, when the foamed cells at the core portion in the article were reduced to disappear, the thickness of the non-foamed outer shell on both surfaces was increased, while the thickness of the non-foamed portion having foamed cells at the core portion was relatively reduced.

Next the mold cavity was changed to 300 mm×300 mm×5 mm thickness with the provision of a relatively fine embossed pattern (HN22; which is a standard of the embossed pattern produced by Nippon Etching Kabushiki Kaisha) and article was carried out similarly under a pressure of the gas in the mold cavity of 6 Kg/cm² to obtain the results as shown by the broken line in FIG. 7. As can be clearly seen from this Figure, when the thickness of the article is thin, not only the foaming ratio of the foamed article is lowered, but also the foaming ratio of the foamed article is markedly lowered as the retention time for feeding of the gas in the mold cavity is prolonged. Also, the embossed pattern transferred onto the surface was found to be worsened to the extent of the transfer as the retention time for feeding of the gas in the mold cavity was prolonged.

REFERENCE EXAMPLE 5

By the use of the same molding machine as in Example 2 and a mold cavity with a thickness of 7 mm, a foamable resin comprising a dry blend of 100 parts by weight of ABS resin, predried at 85° C. for 3 hours, with 0.3 part by weight of azodicarbonamide was plastified and kneaded at 240° C. at a pressure of 80 Kg/cm² to be metered and accumulated. Injection was carried out under an injection pressure of 600 Kg/cm² by varying the injection step as described below, while feeding a gaseous pressure of 8.5 Kg/cm² into the mold cavity of 40° C., followed by release of the gaseous pressure into the atmosphere simultaneously with discontinuation of the injection and cooling for 3 minutes to obtain an article.

The injection step was varied as follows:
(i) injection was discontinued on completion of the injection;
(ii) after completion of the injection, further pressurization was effected before discontinuation of injection;
(iii) after injection filling, pressure was maintained at 550 Kg/cm² for 5 seconds before discontinuation of the injection;
(iv) after injection filling, pressure was maintained at 550 Kg/cm² for 10 seconds before discontinuation of the injection;
(v) after injection filling, pressure was maintained at 550 Kg/cm² for 15 seconds before discontinuation of the injection.

The foaming ratios of the articles obtained by the respective injection steps were measured to obtain the results shown in Table 2. From Table 2, it can clearly be seen that employment of the pressure maintenance, as in conventional injection molding results in high pressure of the pressure in the mold cavity, whereby the foaming ratio of the foamed article is unfavorably lowered, and that discontinuation on completion of the injection is most preferred.

EXAMPLE 1

Figure 8:
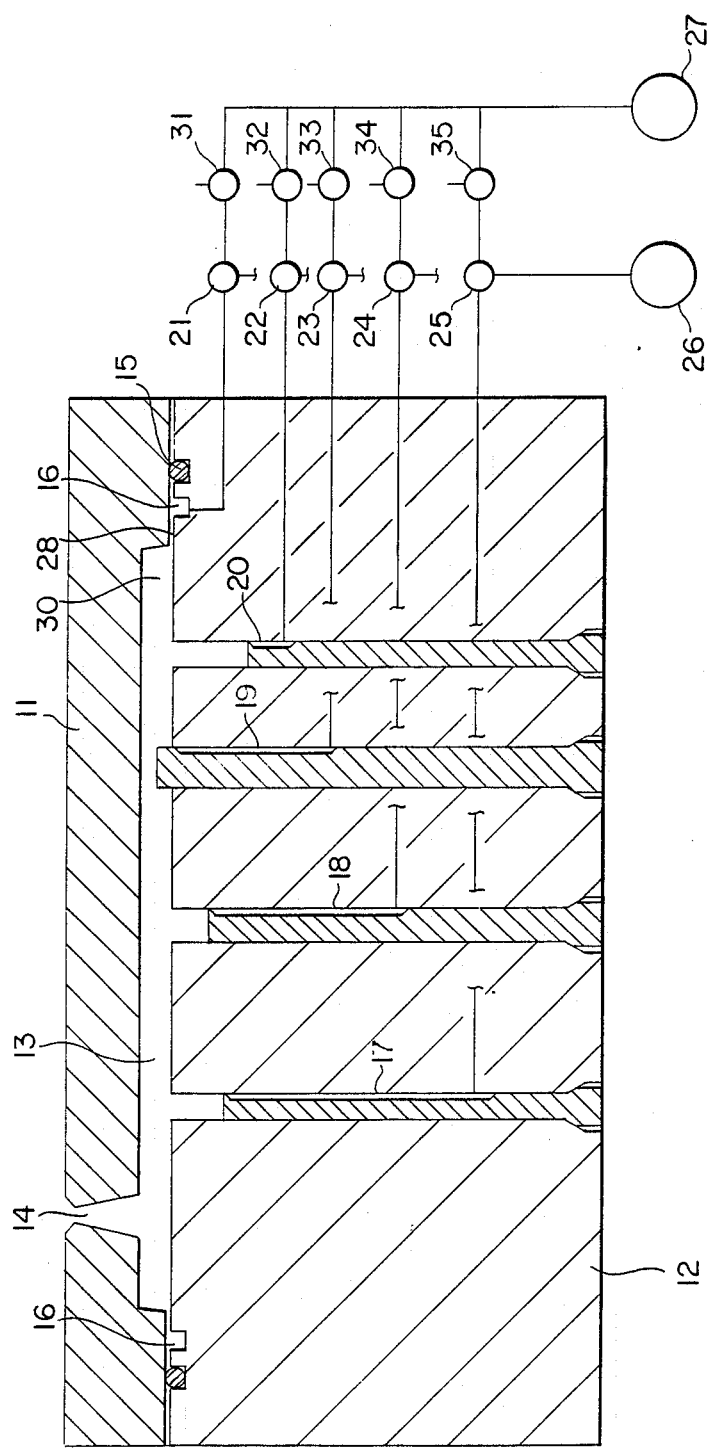
FIG. 8 is a cross-sectional view of the mold capable of practicing the process of the present invention to produce a foamed article having a uniform, swirl-mark free, sink-mark free smooth surface and a foamed core portion.

An in-line type injection molding machine with a mold clamping force of 225 tons was mounted with a mold structure having a mold cavity of 200 mm×200 mm×7 mm thickness which can be pressurized with a gas as shown in FIG. 8. Molding was carried out with the use of the foamable resins and conditions as indicated in Table 3.

Plastifying and kneading and then metering and accumulating were conducted at a back pressure of 80 Kg/cm², the mold cavity was pressurized with nitrogen gas, the foamable resin was injected, the injection was discontinued with closing of an injecting nozzle simultaneously with completion of injection. At the same time feeding of nitrogen gas into the mold cavity through plural slit-like gaps which could bar inflow of the resin communicated to the mold cavity, but permitted passage of a gas, was discontinued. Simultaneously, the mold cavity was communicated to a pressure reduction source of 100 mmHg through said slit-like gaps, followed by cooling of the molding as such in the mold cavity for 3 minutes, and thereafter the article was taken out from the mold. The articles obtained had the foaming ratios as shown in Table 3, each consisting of outer shell; with uniform smooth surface and foamed core portion, without any generation of sinkmark being observed. When shot molding of the above mentioned process was repeated for 200 times continuously, stable foam moldings could be obtained repeatedly with good reproducibility.

TABLE 1

| Foamable resin | Resin temp. (°C.) | Foaming pressure (Kg/cm²) | Smoothing pressure (Kg/cm²) |
| --- | --- | --- | --- |
| SAN (100 wt. parts)/azodicarbonamide (0.3 wt. part) | 230 | 13 | 8 |
| SAN (100 wt. parts)/azodicarbonamide (0.3 wt. part) | 250 | 14 | 10 |
| SAN (100 wt. parts)/azodicarbonamide (0.5 wt. part) | 270 | 15 | 12 |
| SAN (100 wt. parts)/azodicarbonamide (0.7 wt. part) | 230 | 20 | 14 |
| SAN (100 wt. parts)/azodi- | 230 | 31 | 20 |

TABLE 1-continued

| Foamable resin | Resin temp. (°C.) | Foaming pressure (Kg/cm²) | Smoothing pressure (Kg/cm²) |
|---|---|---|---|
| carbonamide (0.7 wt. part) | | | |
| ABS (100 wt. parts)/azodicarbonamide (0.3 wt. part) | 240 | 14 | 7 |
| Modified PPE (200 wt. parts)/azodicarbonamide (0.3 wt. part) | 250 | 18 | 9 |

TABLE 2

| Injection step | | | | In-mold | |
|---|---|---|---|---|---|
| Injection pressure (Kg/cm²) | Pressure maintained (Kg/cm²) | Pressure retention time (sec) | Quantity injected | resin pressure (max.) (Kg/cm²) | Foaming ratio of molding (times) |
| 600 | 0 | 0 | Completion of injection inflow | 33 | 1.06 |
| 600 | 0 | 0 | Injection filling | 85 | 1.05 |
| 600 | 550 | 5 | Injection pressure maintained | 150 | 1.03 |
| 600 | 550 | 10 | Injection pressure maintained | 150 | 1.02 |
| 600 | 550 | 15 | Injection pressure maintained | 150 | 1.02 |

TABLE 3

| Foamable resin | Molding temp. (°C.) | Mold temp. (°C.) | Inflow time (sec.) | Gas Pressure (Kg/cm²) | Foaming ratio of molding (times) |
|---|---|---|---|---|---|
| SAN (100 wt. parts)/Blowing agent I (0.3 wt. part) | 230 | 40 | 1.1 | 8 | 1.07 |
| SAN (100 wt. parts)/Blowing agent I (0.5 wt. part) | 230 | 40 | 1.1 | 15 | 1.08 |
| ABS (100 wt. parts)/Blowing ageng I (0.3 wt. part) | 240 | 40 | 1.1 | 8 | 1.06 |
| Modified PPE (100 wt. parts)/Blowing agent I (0.3 wt. part) | 250 | 40 | 1.2 | 11 | 1.1 |
| Modified PPE (100 wt. parts)/Blowing agent II (0.2 wt. part) | 250 | 40 | 1.2 | 9 | 1.09 |

Blowing agent I: Azodicarbonamide
Blowing agent II: 5-Phenyltetrazole

What is claimed is:

1. A process of making a foamed article having a smooth surface, a non-foamed outer shell and a foamed core portion, comprising:
   (1) plastifying, kneading, metering and accumulating a foamable resin at a pressure which is higher than its foaming pressure and sufficiently suppressing said foamable resin in an unfoamed state;
   (2) injection said foamable resin into a gas-pressurized mold cavity having plural gaps and set at a pressure which is lower than the foaming pressure and not lower than a surface smoothing pressure which is sufficient to form a smooth, swirl-mark free and sink-mark free surface on the non-foamed outer shell, the shell being successively formed at the surface where the resin contacts the mold cavity;
   (3) lowering the pressure within said mold cavity by simultaneously (a) discontinuing injection of said foamable resin, (b) discontinuing feeding of pressurized gas into said mold cavity and (c) releasing gas pressure in said mold cavity to an atmospheric pressure or lower; and
   (4) solidifying said foamed article by cooling and removing said foamed article after solidification wherein said mold cavity is controlled to a mold temperature which is between (a) the dew point of the steam in the air on the mold cavity surface and (b) a temperature 10° C. less than the heat distortion temperature of said resin.

2. A process according to claim 1, wherein said lowering of the pressure within said mold cavity is carried out by making said plural gaps release the pressure to an atmospheric pressure or lower in order that said injected resin contacting with said plural gaps penetrates said mold cavity.

3. A process according to claim 1, wherein the thickness of said mold cavity is not less than 5 mm.

4. A process according to claim 1, wherein said resin injected into said mold cavity attains a foamed state during inflow to said mold cavity and the quantity of said resin injected into said mold cavity is substantially equal to the volume of said mold cavity.

5. A process according to claim 2, wherein said thickness of said mold cavity is not less than 5 mm.

6. A process according to claim 2, wherein said resin injected into said mold cavity attains a foamed state during inflow to said mold cavity and the quantity of said resin injected into said mold cavity is substantially equal to the volume of said mold cavity.

* * * * *